US006630901B1

(12) United States Patent
Winter et al.

(10) Patent No.: US 6,630,901 B1
(45) Date of Patent: Oct. 7, 2003

(54) RADAR SYSTEM IN A MOTOR VEHICLE

(75) Inventors: Klaus Winter, Schwieberdingen (DE); Hermann Mayer, Vaihingen (DE); Bernhard Lucas, Besigheim (DE); Wolfgang Peveling, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 09/914,316

(22) PCT Filed: Nov. 8, 2000

(86) PCT No.: PCT/DE00/02697

§ 371 (c)(1),
(2), (4) Date: Dec. 19, 2001

(87) PCT Pub. No.: WO01/48864

PCT Pub. Date: Jul. 5, 2001

(30) Foreign Application Priority Data

Dec. 24, 1999 (DE) ........................................ 199 63 001

(51) Int. Cl.[7] .......................... G01S 13/93; H01Q 1/02; H01Q 1/42

(52) U.S. Cl. ............................ 342/70; 342/27; 342/28; 342/175; 343/704; 343/711; 343/872; 343/873

(58) Field of Search ............................ 342/27, 28, 70, 342/71, 72, 175, 195; 343/704, 711, 712–717, 720, 872, 873, 700 MS

(56) References Cited

U.S. PATENT DOCUMENTS 4,999,639 A * 3/1991 Frazita et al. ............... 343/704
5,528,249 A * 6/1996 Gafford et al. ............. 343/704

FOREIGN PATENT DOCUMENTS

| | | | | |
|---|---|---|---|---|
| DE | 196 44 164 A1 | 4/1998 | | |
| DE | 197 24 320 A1 | 12/1998 | | |
| DE | 197 36 089 | 12/1998 | | |
| EP | 0478852 B1 | * 7/1995 | ............ | H01Q/1/42 |
| FR | 2632780 A | * 12/1989 | ............ | H01Q/1/42 |
| JP | 11-211821 A | 8/1999 | | |

OTHER PUBLICATIONS

English Abstract of Japanese Patent Publication No. 11211821, Published Aug. 6, 1999, and by Machida Koichi.

* cited by examiner

*Primary Examiner*—Bernarr E. Gregory
(74) *Attorney, Agent, or Firm*—Kenyon & Kenyon

(57) ABSTRACT

A motor vehicle radar system having at least one sensor-radiation transparent body for focusing the sensor beam and/or at least one radome without intentional focusing in the beam path, at least one arrangement made of electrical printed circuit traces being arranged in the area of the sensor-radiation transparent body and/or the radome, the arrangement being suitable at least for heating the sensor-radiation transparent body and/or the radome, electrical power being able to be supplied to the electrical printed circuit traces, power control of the supplied electrical power being carried out as a function of operating states and ambient conditions, such that the surface temperature (TL) of the sensor-radiation transparent body and/or the radome does not exceed preestablished temperature values.

24 Claims, 5 Drawing Sheets

RADAR SYSTEM IN A MOTOR VEHICLE

FIELD OF THE INVENTION

The present invention relates to a motor vehicle radar system.

BACKGROUND OF THE INVENTION

Motor vehicle radar systems are used, for example, in the context of a vehicle automatic speed control for detecting vehicles traveling ahead. One system is also termed Adaptive Cruise Control (ACC). In order to influence the electromagnetic waves used and thus also to protect the radar system from atmospheric conditions, a body is usually located in the beam path of the electromagnetic waves. Often this body is a component of a housing that surrounds a motor vehicle radar system of this type.

BACKGROUND INFORMATION

In German Patent No. 197 36 089, a metal plate lens is described, which is used for focusing or dispersing electromagnetic waves. The metal plate lens described is used preferably in a motor vehicle radar system. German Patent No. 197 36 089, is based on the consideration that, in the context of a radar system for automatic distance warning in a motor vehicle, specific conditions of use result in covering deposits, especially of snow or slush, building up on the lens. As a result of deposits of this type, electromagnetic waves passing through the lens are substantially dampened, which can ultimately lead to the total failure of the radar system. To improve the metal plate lens with regard to the aforementioned difficulties, it is proposed that, in at least one of the metal plates, there is a contact which can supply a heating current to the metal plate. In this context, the aforementioned metal plate can be connected in an electrically conductive manner to further metal plates of the lens, so that a supplied heating current also flows through the further metal plates. The aforementioned metal plate and the further metal plates can be connected to each other in series, in parallel, or in another switchable combination. So that the metal plate lens can also simultaneously function as a weather-proof covering for the actual motor vehicle radar system, the space between the metal plates of the metal plate lens is filled with a solid or foam dielectric. To increase the heating power, the metal plates to which a heating current can be supplied have a partial area which has an increased specific ohmic resistance in comparison to copper. This specific ohmic resistance increases the power loss, which results in greater heating power and therefore in a more powerful heating of the antenna lens.

From German Patent No. 196 44 164, a motor vehicle radar system is known that has at least one transmitting/receiving element for transmitting and/or receiving electromagnetic waves, a lens-shaped dielectric body being disposed in the beam path of the at least one transmitting/receiving element for focusing or dispersing the electromagnetic waves. The lens-shaped dialectic body, which also protects the transmitting/receiving element from atmospheric conditions, has an arrangement made of electrically conductive printed circuit traces, whose width, at a maximum, constitutes a tenth-wave, and whose distances from each other, at a minimum, constitute a quarter-wave, lambda designating the free-space wavelength of the electromagnetic waves. The electrically conductive printed circuit traces, in this context, are arranged so as to be predominantly perpendicular to the polarization direction of the electromagnetic waves. The arrangement composed of electrically conductive printed circuit traces, in accordance with the desired application, can be disposed on the inner side of the dielectric body, i.e., the side that is facing the transmitting/receiving elements, the outer side, or even within the dielectric body. If a heating current flows through the electrically conductive arrangement, the dielectric body can in this manner be freed from deposits such as ice, snow, or slush. Similarly, using a heating current, the dielectric body can be dried or can be kept dry. Furthermore, it is disclosed that the possibility exists to subdivide the electrically conductive arrangement into at least two components, that are separated from each other. In this constellation, if the arrangement composed of electrically conductive printed circuit traces is situated on the outer side of the dielectric body, it is possible, by measuring the capacitance between the two separated components of the arrangement, to arrive at conclusions as to a so-called loss angle tan $\delta$ of the coating material. In other words, it is possible to establish a contamination of the dielectric body. As a function of this established contamination, or of an established dirt covering, a heating current, which flows through the electrically conductive arrangement, can be switched on. On the other hand, by being subdivided into at least two areas, the heating power can be varied, for example, for a rapid heating up of an ice-covered lens using high heating power and subsequently keeping the lens free using reduced heating power. From German Patent No. 196 44 164, it is also known that the electrical printed circuit traces, in a ceramic body, are applied using a known thick-film technology, whereas in bodies made of plastic, cost-effective methods, that are also known, can be used for imprinting the electrical printed circuit traces.

German Published Patent Application No. 197 24 320 discloses a method for manufacturing a heatable antenna lens. A heatable antenna lens made of a dielectric body is described, which contains within it an arrangement made of electrical printed circuit traces. In this context, the arrangement made of electrically conductive traces is situated as close as possible to the outer surface of the lens to be heated, as a result of which there is a reduction in the heating power by applying the energy closely underneath the surface to be heated. In addition, accelerated heating-up behavior results from this. It is also described that it is possible to achieve an efficient adjustability of the heating power as a result of the fact that wires are used that have a desired resistance behavior. This can be, for example, a resistance wire.

Both German Patent No. 197 36 089, and German Patent No. 196 44 164 as well as German Published Patent Application No. 197 24 320 describe various possibilities for freeing a motor vehicle radar system from coatings of ice, snow, or slush. The two first cited documents disclose the possibility of regulating the heating power as a result of the fact that either the metal plates are connected to each other in various combinations or at least two electrically conductive arrangements are combined for regulating the heating power accordingly. German Published Patent Application No. 197 24 320, on the other hand, discloses only the possibility of adjusting the heating power using wires having a desired resistance behavior. In the aforementioned systems, at lower external temperatures and at higher driving speeds, the result is a powerful cooling of the surface due to the convection at the surface of the radar system. In this context, depending on the ambient conditions and the driving speed, it is possible that despite a switched-on maximum heating power, temperatures at the surface of the radar system can be close to the freezing point.

SUMMARY OF THE INVENTION

The object of the present invention lies in indicating a motor vehicle radar system that is better adapted to the ambient conditions. This objective is achieved as a result of the fact that in a motor vehicle radar system having at least one sensor-radiation transparent body for focusing the sensor beam and/or a radome without the desired focusing in the beam path, at least one arrangement made of electrical printed circuit traces being disposed in the area of the sensor-radiation transparent body and/or the radome, the arrangement being appropriate at least for heating the sensor-radiation transparent body and/or the radome, it being possible to supply electrical power to the electrical printed circuit traces, power control of the supplied electrical power being carried out as a function of the operating states and ambient conditions, such that the surface temperature of the sensor-radiation transparent body and/or of the radome does not exceed preestablished temperature values. In this context, the sensor-radiation transparent body is advantageously a dielectric lens, thus making possible a particularly compact design.

In contrast to the systems known from the related art, the motor vehicle radar system according to the present invention offers the advantage that power control is carried out for the supply of electrical power and is made a function of not only on a possibly detected degree of soiling but rather on operating states and ambient conditions. In this context, the power control according to the present invention is designed such that the surface temperature of the sensor-radiation transparent body and/or the radome does not exceed predetermined temperature values. As a result, the sensor-radiation transparent body and/or the radome is prevented from being damaged by impermissibly high temperature values.

The preferred embodiment of the motor vehicle radar system according to the present invention provides that power control is accomplished as a result of the fact that a dropping voltage on the electrical printed circuit traces is not constant over time. According to the present invention, this can result from the fact that the voltage is a fundamental voltage that is clocked by a switch at a preestablished pulse-duty factor. Advantageously, the operating voltage of the vehicle electrical system is used as the fundamental voltage. This embodiment of the power control according to the present invention offers the advantage that, on the one hand, via a preestablished pulse-duty factor, the temporal average value of the supplied electrical power can be precisely controlled and that, on the other hand, as the clocked fundamental voltage the operating voltage is used, which is permanently available in the vehicle electrical system without further transformation or conversion.

It is of special advantage if the voltage is a function of at least one of the following operating states and/or one of the following ambient conditions:

1. the operating voltage of the motor vehicle electrical system,
2. the ambient temperature outside the motor vehicle,
3. the speed of the motor vehicle itself, and
4. the surface temperature of the sensor-radiation transparent body and/or the radome.

As a result of one or a plurality of the aforementioned parameters, the voltage dropping off at the electrical printed circuit traces is adjusted in a particularly advantageous manner to the operating states and/or ambient conditions. It is also advantageous if at least one of the aforementioned quantities is available on a vehicle-internal bus system, for example, the CAN bus, because, in this manner, it is possible to fall back on measuring quantities which are already available inside the vehicle system, and as a result, no additional measuring data and/or sensors are necessary.

Determining the aforementioned pulse-duty factor can be carried out by a control unit, there being advantageously present in the control unit a memory, in which an input-output map can be stored. In this manner, during the operation of the motor vehicle radar system, no calculation-intensive operations are necessary to determine the pulse-duty factor of the voltage, but rather a corresponding value for the pulse-duty factor has only to be read out from an input-output map stored in the memory as a function of preestablished operating states and/or ambient conditions. This is a particularly rapid, cost-effective, and very precise way to determine the pulse-duty factor.

In the motor vehicle radar system according to the present invention, it is also provided to measure the operating voltage of the vehicle electrical system using an analog-digital converter, which, together with the control unit, can be integrated in a radar system control unit. In this manner, the actual operating voltage of the vehicle electrical system can be measured, which, e.g., after a long period of standing at low ambient temperatures, can significantly deviate from values that the operating voltage of the vehicle electrical system has, for example, at moderate external temperatures and after long highway travel. Having knowledge of the operating voltage of the vehicle electrical system, determined in this manner, a particularly exact power control can be carried out.

A particularly advantageous embodiment of the motor vehicle radar system provides that the arrangement made of electrical printed circuit traces is dimensioned such that the electrical resistance of the electrical printed circuit traces is so small that in response to a lasting pulse-duty factor of 1, a multiple of the actually permissible heating power results. In other words, the electrical printed circuit traces are designed from the point of view of their electrical resistance, such that a long-term operation at maximum fundamental voltage, or operating voltage of the vehicle electrical system, would lead to unacceptably high heating power and therefore to the destruction of the motor vehicle radar system. As a result of this type of design of the electrical printed circuit traces, it is possible, on a short-term basis, to supply to the motor vehicle radar system power which, if used on a long-term basis, would result in destruction. In this manner, a more rapid, particularly advantageous heating-up behavior of the motor vehicle radar system is achieved.

A further embodiment of the motor vehicle radar system provides that the arrangement of the electrical printed circuit traces is made of a ferromagnetic material. A ferromagnetic material of this type offers the advantage that, as a result of the positive temperature coefficient of the material, the motor vehicle radar system is self-protected from overheating. Furthermore, ferromagnetic material, especially in a latticed arrangement, offers the advantage that low-frequency interference radiation is suppressed especially efficiently. This can relate to both the entry as well as the exit of interference radiation.

DETAILED DESCRIPTION

Figure 1:
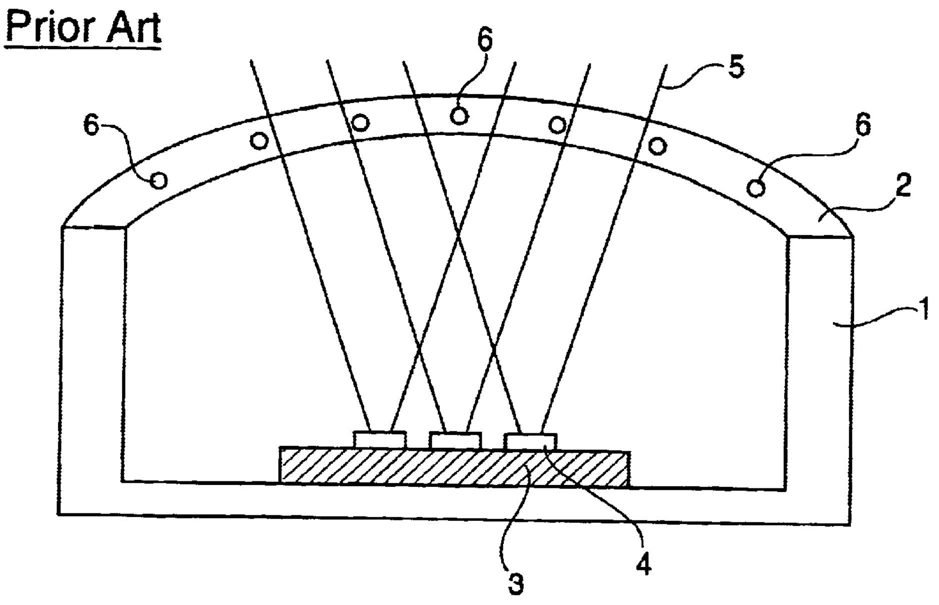
FIG. 1 depicts the principal design of a motor vehicle radar system, as it is known from the related art.

FIG. 1 depicts the basic design of a motor vehicle radar system as it is already known from the related art. The external dimensions of the motor vehicle radar system are determined by a housing 1 and a dielectric lens 2. Inside housing 1 is a base plate 3, on which are arranged radiator elements both for transmitting as well as for receiving a radar beam. In this exemplary embodiment, three radiator elements are depicted, the radar system according to the present invention being capable of being expanded or reduced by any number of radiator elements. The lines designated as 5 are the possible beam paths of the radar beam. Within lens 2, embedded electrical printed circuit traces are designated by reference numeral 6, the electrical contacts of these printed circuit traces not being depicted in this Figure.

Figure 2A:
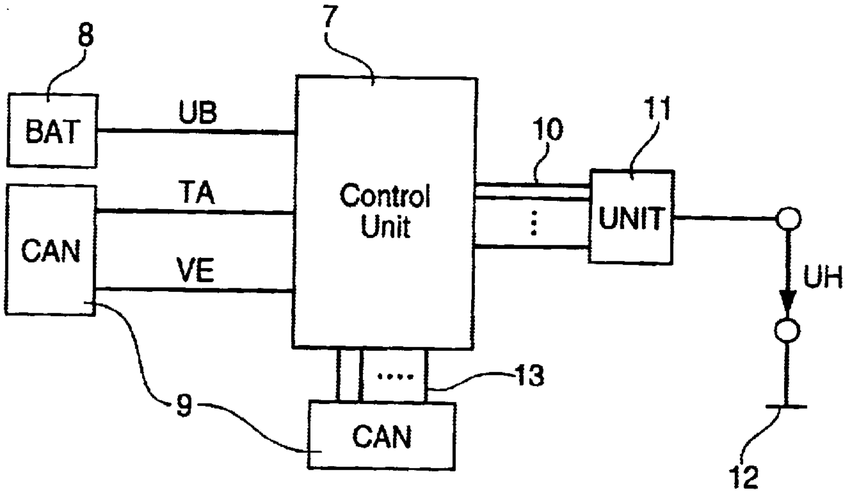
FIG. 2*a* is a first illustration of an embodiment of a circuit according to the present invention for power control, which is integrated in a motor vehicle radar system according to the present invention.
Figure 2B:
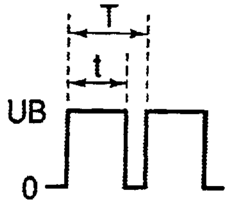
FIG. 2*b* is a second illustration of an embodiment of a circuit according to the present invention for power control, which is integrated in a motor vehicle radar system according to the present invention.

FIG. 2*a* depicts a control unit 7 having a possible external circuit element, as it is integrated in a motor vehicle radar system according to the present invention. The operating voltage of vehicle electrical system UB is supplied to the control unit from the battery of motor vehicle 8 via a control line. The CAN bus of the motor vehicle is designated as 9. From CAN bus 9, external temperature TA as well as motor vehicle speed VE are supplied to control unit 7 via control lines. If necessary, further data on the operating states and/or ambient conditions can be supplied to CAN bus 9 via a sketched-in further connecting line 13. Inside control unit 7, as a function of the input quantities, voltage UH, which is for the power control of the electrically conductive printed circuit traces, is determined. In this context, voltage UH can, in principle, take on different curves. As an example, in FIG. 2*b*, voltage UH is the operating voltage of the vehicle electrical system (pulse-width control system) which is clocked at a pulse-duty factor t/T. According to the embodiment depicted in FIG. 2*c*, voltage UH is a regulated DC voltage, which can take on values between 0 and UB. Depending on the type of drive for voltage UH that is selected, the data are transmitted to unit 11 via connecting lines 10. In accordance with the desired drive principle, unit 11 is composed either of a switch, as in the case of FIG. 2*b*, a DC motor controller, or a DC voltage controller, as in the case of FIG. 2*c*. A possible switch inside unit 11 can be, for example, a transistor, a relay, or any other switch. The output of unit 11 makes available the desired voltage UH with respect to ground 12 of the vehicle electrical system. This voltage UH is applied to the electrically conductive printed circuit traces and, in this manner, it generates the desired power loss in the electrical printed circuit traces. To convey the value of operating voltage UB of the vehicle electrical system from battery 8 to the control unit, that an analog-digital converter is provided, which correspondingly prepares operating voltage UB of the vehicle electrical system for control unit 7. This analog-digital converter, in this context, can be integrated in control unit 7, or it can be situated at any location within the motor vehicle, integration in control unit 7 being a particularly cost-effective and space-saving solution. Alternatively, operating voltage UB of the vehicle electrical system may, of course, already be available on CAN bus 9 and may be supplied to control unit 7 via connecting line 13. This depends on the specific configuration of the bus system in the vehicle. Alternatively, the voltage curves depicted in FIGS. 2*b* and 2*c*, as the maximum value, can also take on a different value than the operating voltage of vehicle electrical system UB. A maximum value of this type, or even fundamental voltage UG, can, if appropriate, take on any values lying both below UB as well as above UB. In the latter case, operating voltage UB of the vehicle electrical system is increased through circuit engineering or to transform it accordingly.

Control unit 7 can be, for example, a part of an already existing radar system control unit. A radar system control unit of this type is usually integrated within the housing depicted in FIG. 1. In the rough depiction in FIG. 1, this was not shown. Of course, it is also possible that control unit 7 be located at any point within the motor vehicle. If necessary, the analog-digital converter, which converts operating voltage UB of the vehicle electrical system, can constitute, for example, an external component, but integration in control unit 7 is also possible.

The primary purpose of power control is that the surface temperature of the sensor-radiation transparent body, i.e., dielectric lens 2, not be exceeded. To generate the appropriate drive signals for the switch, or controller 11, under this boundary condition within control unit 7, there is present in control unit 7 a memory, in which one or a plurality of input-output maps are stored. A possible input-output map for selecting a pulse-duty factor t/T will be explored in greater detail in the context of the description regarding FIG. 5.

Figure 5:
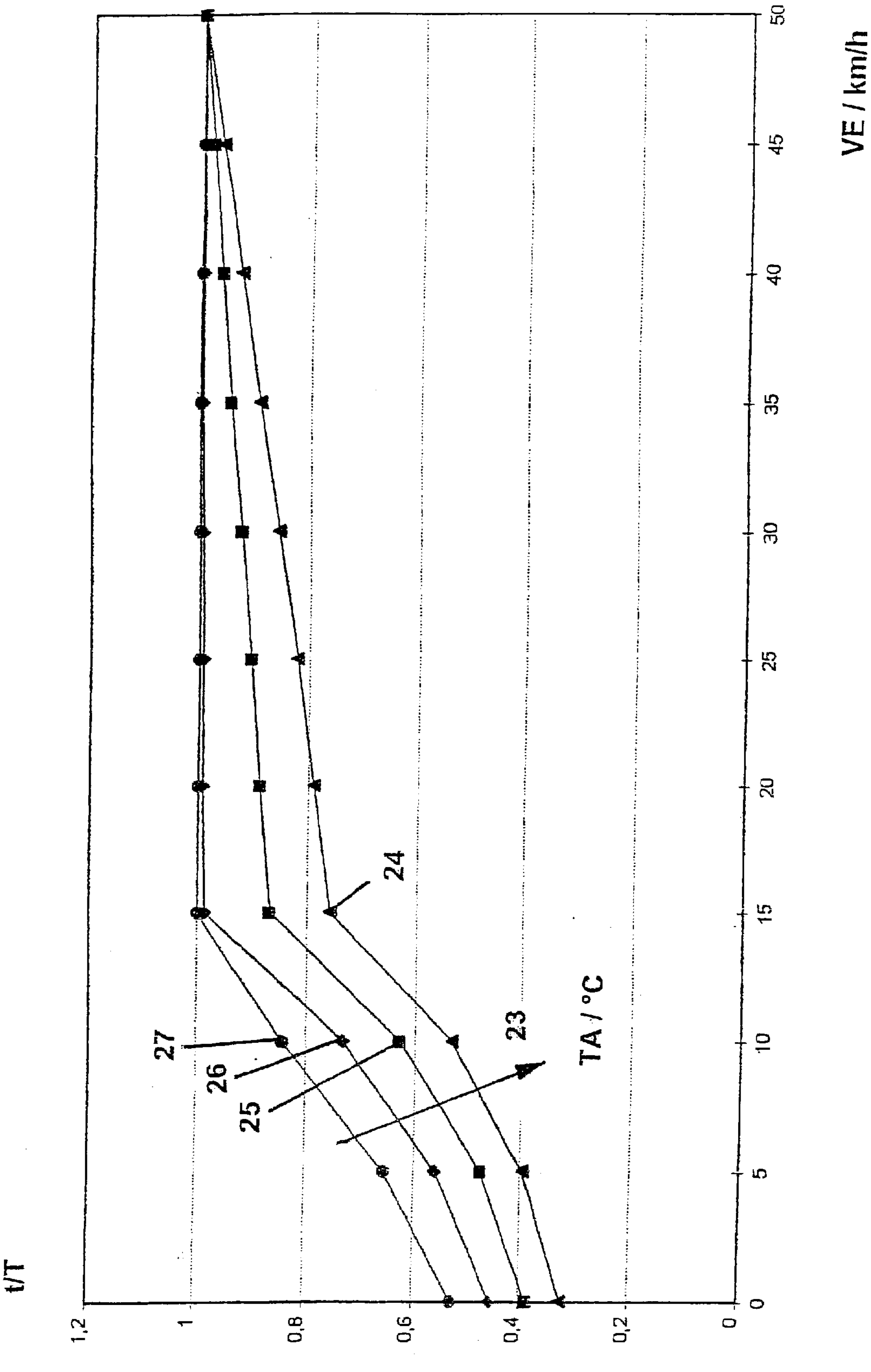
FIG. 5 depicts various curves of the pulse-duty factor of a motor vehicle radar system according to the present invention as a function of the external temperature and the speed of the motor vehicle.

One particularly important detail of the motor vehicle radar system according to the present invention lies in the fact that the arrangement made of electrical printed circuit traces 6 is dimensioned such that the electrical resistance of electrical printed circuit traces 6 is so small that, at a long-lasting pulse-duty factor of t/T=1, a multiple of the actually permissible heating power results. In other words: if, as fundamental voltage UG, operating voltage UB of the vehicle electrical system is selected and a long-lasting pulse-duty factor t/T=1 is set, then this signifies that operating voltage UB of the vehicle electrical system, i.e., the battery voltage of the motor vehicle, is directly applied as heating voltage UH to electrically conductive printed circuit traces 6. The current generated by the voltage would lead, within the electrical printed circuit traces, to a power loss that after a certain time would unacceptably heat up the material of dielectric lens 2 such that damage would result to dielectric lens 2. In the extreme case, as a result of overheating electrical printed circuit traces 6, i.e., dielectric lens 2, the consequence would be a fire in the motor vehicle radar system as a whole. Precisely as a result of this design of electrical printed circuit traces 6, in connection with power control according to the present invention, it is possible in a particularly advantageous manner to heat up dielectric lens 2 with all due speed. For example, when the drive is operating using a corresponding input-output map, it is possible to select a large pulse-duty factor for a short initial period, in order to achieve for the first moment a rapid heating-up of dielectric body 2. Similarly, as is depicted in FIG. 5, the pulse-duty factor can be a function of the external temperature and the speed of the motor vehicle. If the design of electrical printed circuit traces 6 would lead to the destruction of the motor vehicle radar system when standing still and when the external temperatures were mild, if a pulse-duty factor were selected of t/T=1, then it would be possible to drive electrical printed circuit traces 6 permanently at the maximum pulse-duty factor, for example, at speeds of roughly 15 to 25 km/h and external temperatures of −25° C., without the printed circuit traces being damaged. Other possibilities for the design of the input-output maps, or for driving the heating power, will be discussed in greater detail in the context of the description regarding FIG. 5.

Figure 3:
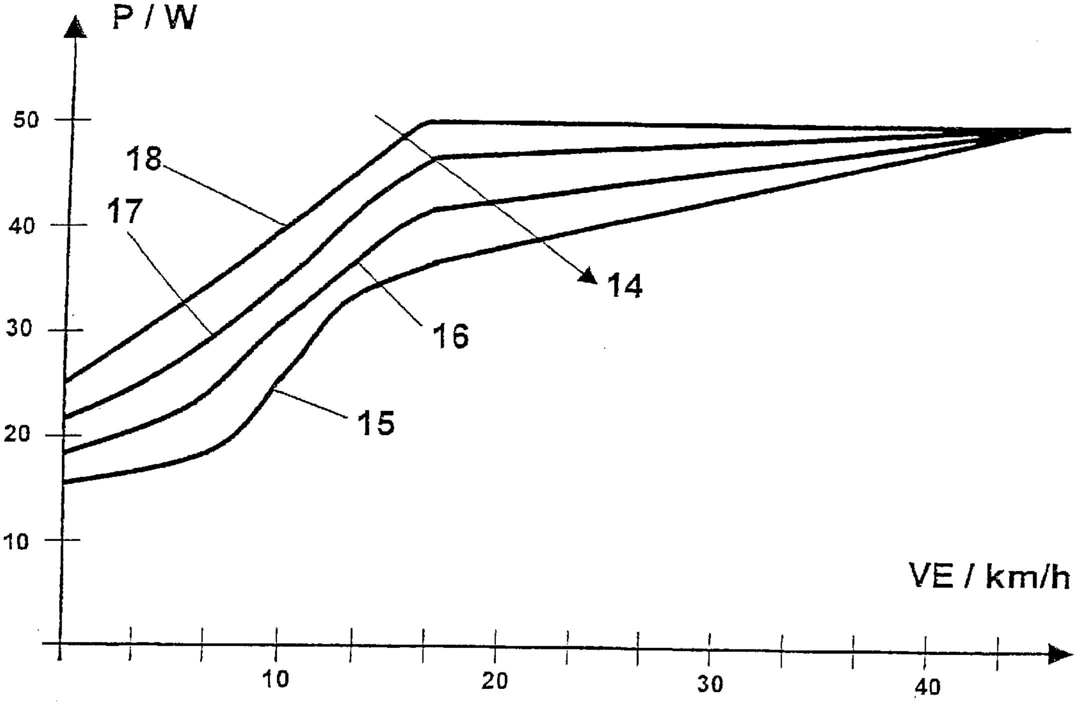
FIG. 3 depicts examples of power control as a function of the external temperature and the speed of the motor vehicle.

FIG. 3 depicts examples of power control as a function of the external temperature and the motor vehicle speed. On the vertical axis, electrical power P supplied to electrical printed circuit traces 6 is depicted in watts. On the horizontal axis, speed VE of the motor vehicle is plotted in km/h. Various characteristic curves 15 through 18 represent examples of power curves at different external temperatures TA. Arrow 14 indicates the direction of the rising temperatures. In this exemplary embodiment, characteristic curve 15 is plotted for an external temperature of +5° C., characteristic curve 16 for an external temperature of −5° C., characteristic curve 17 for an external temperature of −15° C., and characteristic curve 18 for an external temperature of −25° C. It can be seen that at higher external temperatures and at lower speeds, a correspondingly reduced electrical power is supplied to electrical printed circuit traces 6. Given falling external temperatures and rising speeds, electrical power P supplied to the electrical printed circuit traces rises. In the extreme case, at an external temperature of −25° C., corresponding to characteristic curve 18 in the example, it can be seen that already beginning at speeds of somewhat less than 20 km/h, maximum deliverable power P can be transmitted to electrical printed circuit traces 6 without their being damaged.

Figure 4:
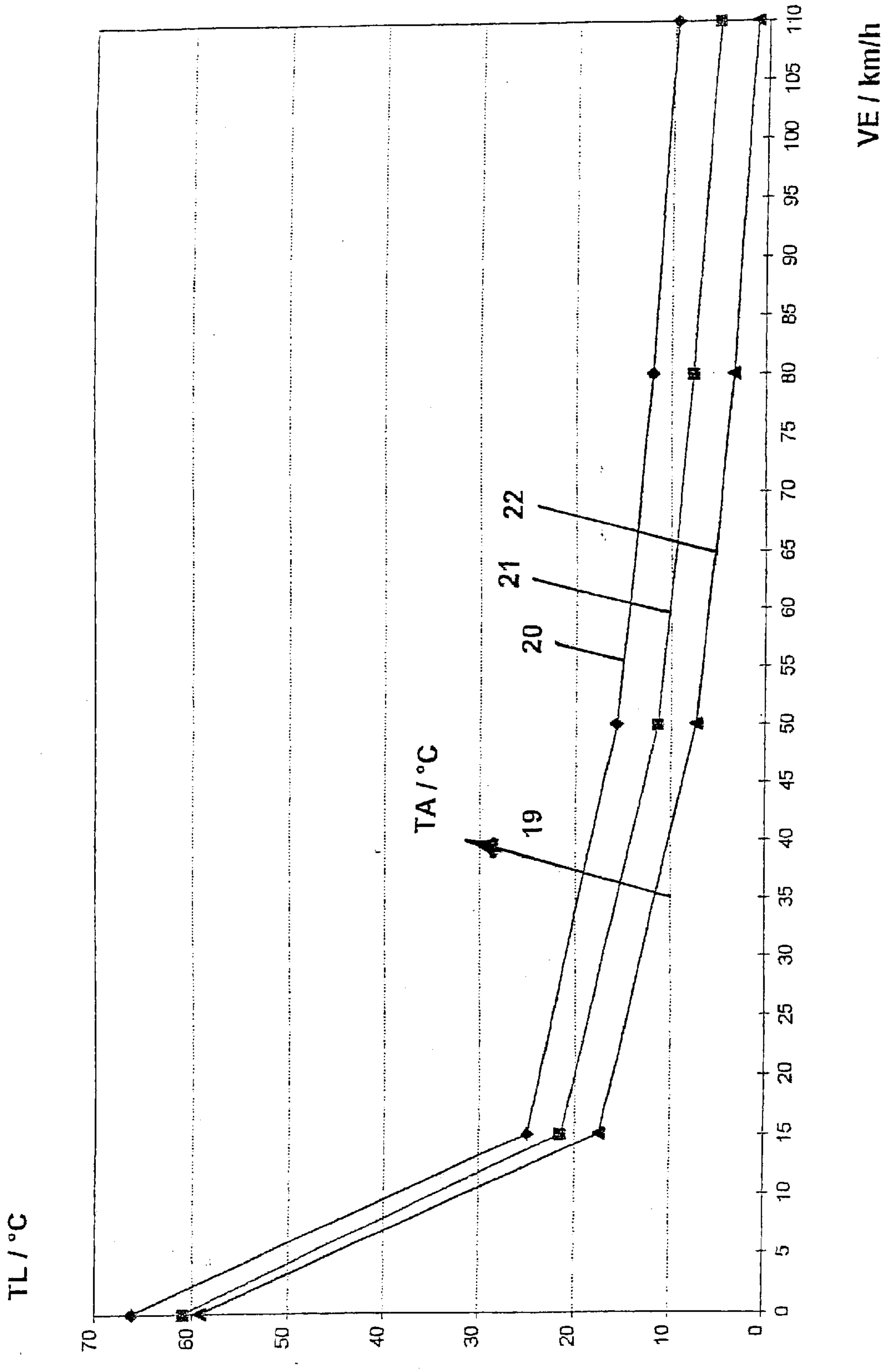
FIG. 4 depicts the possible temperature curves at the exterior surface of a motor vehicle radar system as a function of the external temperature and the vehicle speed, temperature curves being represented here that correspond to the related art.

FIG. 4 depicts, by way of example, temperature curves that were measured at the outer side of the dielectric lens, in a motor vehicle radar system that corresponds to the related art. On the vertical axis, the exterior temperature of dielectric lens TL is plotted in ° C. On the horizontal axis, motor vehicle speed VE is plotted in km/h. Characteristic curves 20, 21, and 22, depicted by way of example, are the measured temperature curves at different external temperatures TA. The direction of increasing temperatures TA in ° C. is indicated by arrow 19: Specifically, characteristic curve 20 represents an external temperature of 0° C., characteristic curve 21 an external temperature of −5° C., and characteristic curve 22 an external temperature of −10° C. It can easily be seen that at external temperatures of 0° C., corresponding to characteristic curve 20, and at speeds of roughly 100 km/h, the exterior temperature of the dielectric body sinks to the range of 10° C. As a result of this low temperature, which can occur even during slow highway travel, no sufficiently rapid melting of potential snow and ice residues is assured on the dielectric lens. Usually the driver of the motor vehicle expects that the motor vehicle radar system will continue to remain operational even in response to the onset of snow, rain, or hail, or even swirling slush from vehicles traveling ahead, and that it is not to be switched off.

FIG. 5 depicts a possible characteristics field such as can be stored, by way of example, in the memory in control unit 7 of the motor vehicle radar system. In the characteristics field depicted in FIG. 5, which is parametered over external temperature TA, along the vertical axis a pulse-duty factor t/T is depicted corresponding to the description with respect to FIG. 2*b*. On the horizontal axis, vehicle speed VE is plotted in km/h. In the characteristics field depicted here, four characteristic curves 24, 25, 26, and 27 are entered by way of example. Different characteristic curves 24 through 27 are each plotted in ° C. for different external temperatures TA. The direction of higher external temperatures TA in ° C. is indicated by arrow 23. In this specific exemplary embodiment, characteristic curve 24 represents an external temperature of +5° C., characteristic curve 25 an external temperature of −5° C., characteristic curve 26 an external temperature of −15° C., and characteristic curve 27 an external temperature of −25° C. It is clear that at moderate external temperatures of +5° C., which is represented by characteristic curve 24, a pulse-duty factor of 1 only results above travel speeds of roughly 50 km/h, which is the equivalent of the assertion that heating voltage UH, which is applied at the electrically conductive printed circuit traces, is the immediately applied fundamental voltage UG, i.e., operating voltage UB of the vehicle electrical system. At extremely low external temperatures of, for example, −25° C., as indicated by characteristic curve 27, the pulse-duty factor of 1 is achieved already at low travel speeds beginning at 15 km/h. This is connected with the fact that at these extremely low external temperatures, even at low travel speeds, the convection at the surface of the motor vehicle radar system is so large that maximum power can be made available to the electrically conductive printed circuit traces without having to fear damage to the radar system. If, in one of the cases depicted here, a pulse-duty factor of 1 were selected already, when the motor vehicle was standing still, this would inevitably, after a certain time, lead to the destruction of the motor vehicle radar system. Therefore, in this connection, the evaluation and the drive, inside control unit 7, are furnished with the appropriate safety functions in order to assure that normal functioning of the power control is provided and that the motor vehicle radar system does not suffer damage.

In FIG. 5, four characteristic curves are depicted by way of example. However, it is generally possible that the characteristics field can include fewer or any number of characteristic curves. Data lying between the individual characteristic curves can be obtained using any interpolation method. In addition, it is possible that pulse-duty factor t/T is dependent on parameters other than the vehicle speed and external temperature TA. These can be, e.g., operating voltage UB of the vehicle electrical system or surface temperature TL of the sensor-radiation transparent body and/or the radome. If the parameter is operating voltage UB of the vehicle electrical system, then, as a result of the power control system, e.g., at low external temperatures, it is possible to compensate for a lowered nominal operating voltage UB of the vehicle electrical system by a correspondingly increased driving of the clock pulse signal. Fundamentally, the motor vehicle radar system is capable of carrying out power control without having precise information on actual surface temperature TL of the sensor-radiation transparent body and/or the radome, in these exemplary embodiments specific to the dielectric lenses. Therefore, an additional costly temperature sensor can be dispensed with, and the motor vehicle radar system can function entirely on the basis of previously determined characteristics fields. However, if a sensor of this type is present, which measures surface temperature TL of the dielectric lens, then this information can, of course, be applied to the power control and can be made available to control unit 7 of the motor vehicle radar system.

Furthermore, it is within the bounds of the motor vehicle radar system according to the present invention that a microprocessor, situated in control unit 7, determine a pulse-duty factor from the supplied data on the basis of a preestablished calculation specification.

Figure 2C:
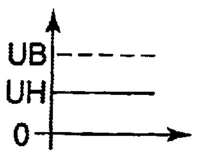
FIG. 2*c* is a third illustration of an embodiment of a circuit according to the present invention for power control, which is integrated in a motor vehicle radar system according to the present invention.

Analogously to the characteristics field depicted in FIG. 5, having pulse-duty factor t/T as output quantity, it is easily possible to store in the memory of control unit 7 a characteristics field that, as output quantity, has a DC voltage UH, in accordance with the depiction in FIG. 2*c*. In this context as well, there could be analogous parameters and curves, as are a depicted in FIG. 5. For realizing a possible DC voltage control process, reference is made to known solutions in the corresponding technical area.

In order to keep the storage space requirements of the characteristics field small, it is possible, beginning at preestablished vehicle speeds VE (for example, 50 km/h), to switch to maximum power (corresponding to pulse-duty factor t/T=1).

Figure 6:
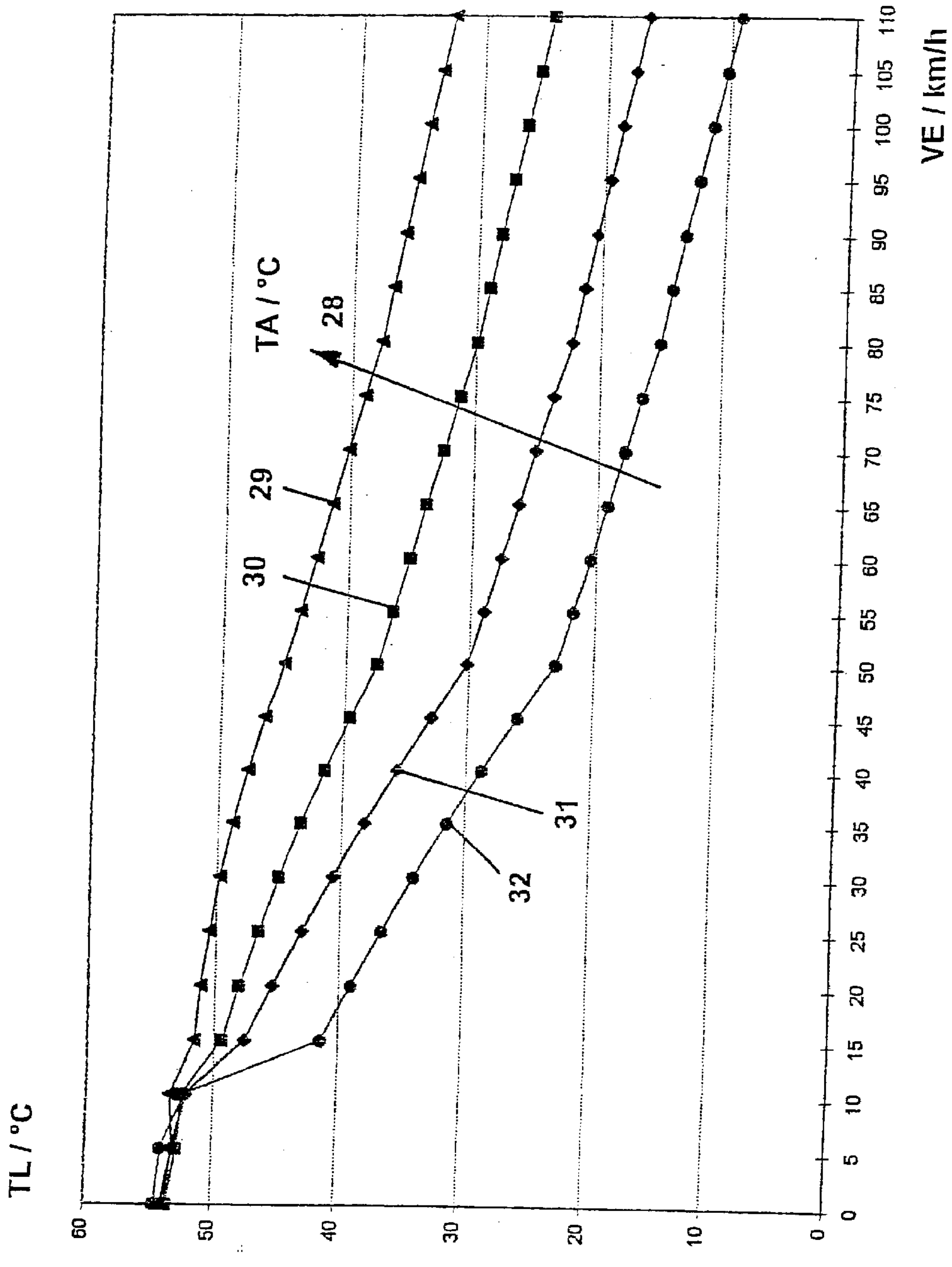
FIG. 6 depicts the possible temperature curves at the outer surface of a motor vehicle radar system according to the present invention as a function of the external temperature and the speed of the motor vehicle.

FIG. 6 depicts temperature curves that result at the surface of the dielectric body in the motor vehicle radar system according to the present invention. In this context, the surface temperature of dielectric lens TL is depicted in ° C. as a function of vehicle speed VE in km/h, and for various external temperatures TA in ° C. Arrow 28, in this context, symbolizes the direction of rising external temperatures TA in ° C. The represented characteristic curves 29, 30, 31, and 32 are depicted for external temperatures of 5° C., −5° C., −15° C., and −25° C. It is obvious that, for example, at an external temperature of −5° C., corresponding to characteristic curve 30, in the motor vehicle radar system according to the present invention, the surface temperature of dielectric lens TL reaches a temperature of 25° C., even at vehicle speeds VE above 100 km/h. In comparison to characteristic curve 21 in accordance with FIG. 4, which corresponds to a motor vehicle radar system according to the related art, this means a temperature increase of virtually 20° C. in the corresponding speed range. In general, in comparison with the characteristic curves depicted in FIG. 4, it is clear that the motor vehicle radar system according to the present invention has a significant temperature advantage of up to 20° C., especially at higher vehicle speed values.

It is also within the context of the motor vehicle radar system according to the present invention that the power control be dependent on other heretofore unmentioned parameters. Possible parameters could be, for example, information from a rain sensor, altitude information from a GPS device, wind speed values, a possible detected contamination of the dielectric lens by ice and snow, information on the intensity of the exposure to sunlight, the driving condition in a region sheltered from the winds, which in a motor vehicle radar system is easy to determine.

Overall, as a result of the motor vehicle radar system according to the present invention, a somewhat greater heating power is possible than in conventional systems, without the material of the lens or of the radome being damaged when the vehicle is standing still. The motor vehicle radar system has accelerated heating-up behavior and improved snow-and-ice-thawing while traveling. Overall, the system according to the present invention represents a simple, cost-effective solution, because no additional hardware components are necessary. By taking into account current vehicle electrical system voltage UB, possible electrical system fluctuations are compensated for in a particularly advantageous manner.

What is claimed is:

1. A motor vehicle radar system, comprising:

a structure including at least one of:

at least one sensor-radiation transparent body for focusing a sensor beam, and at least one radome without intentional focusing in a beam path; and at least one arrangement including electrical printed circuit traces disposed in an area of at least one of the at least one sensor-radiation transparent body and the at least one radome, wherein:

the at least one arrangement heats at least one of the least one sensor-radiation transparent body and the at least one radome, an electrical power is supplied to the electrical printed circuit traces, and a power control of the supplied electrical power is carried out as a function of operating states and ambient conditions, such that a surface temperature of at least one of the at least one sensor-radiation transparent body and the at least one radome does not exceed a preestablished temperature value.

2. The motor vehicle radar system according to claim 1, wherein: the at least one sensor radiation-transparent body includes a dielectric lens.

3. The motor vehicle radar system according to claim 1, wherein:

the power control is exercised as a result of a voltage that drops off at the electrical printed circuit traces and that is not constant over time.

4. The motor vehicle radar system according to claim 3, wherein:

the voltage is a fundamental voltage that is clocked at a preestablished pulse-duty factor via a switch.

5. The motor vehicle radar system according to claim 4, wherein:

the fundamental voltage is the operating voltage of the vehicle electrical system.

6. The motor vehicle radar system according to claim 5, wherein:

the at least one arrangement is dimensioned such that an electrical resistance of the electrical printed circuit traces is so small that at a long-lasting pulse-duty factor of t/T=1, a multiple of an actually permitted heating power results.

7. The motor vehicle radar system according to claim 4, further comprising: a control unit for determining the pulse-duty factor.

8. The motor vehicle radar system according to claim 7, wherein:

the control unit includes a memory for storing an input-output map.

9. The motor vehicle radar system according to claim 7, further comprising:

an analog-digital converter integrated with the control unit and for measuring an operating voltage of a vehicle electrical system.

10. The motor vehicle radar system according to claim 3, wherein:

the voltage is a function of at least one of a set of quantities including:

an operating voltage of a vehicle electrical system, an ambient temperature outside a motor vehicle, a speed of the motor vehicle, the surface temperature of at least one of the at least one sensor-radiation transparent body and the at least one radome.

11. The motor vehicle radar system according to claim 10, wherein:

at least one of the set of quantities is made available to a bus system within the motor vehicle.

12. The motor vehicle radar system according to claim 1, wherein:

the at least one arrangement includes a ferromagnetic material.

13. A motor vehicle radar system, comprising:

a structure including at least one of:

at least one sensor-radiation transparent body for focusing a sensor beam, and at least one radome without intentional focusing in a beam path; and at least one arrangement including a conducting path disposed in an area of at least one of the at least one sensor-radiation transparent body and the at least one radome, wherein:

the at least one arrangement heats at least one of the least one sensor-radiation transparent body and the at least one radome, an electrical power is supplied to the conducting path, and a power control of the supplied electrical power is carried out as a function of operating states and ambient conditions, such that a surface temperature of at least one of the at least one sensor-radiation transparent body and the at least one radome does not exceed a preestablished temperature value.

14. The motor vehicle radar system according to claim 13, wherein:

the at least one sensor radiation-transparent body includes a dielectric lens.

15. The motor vehicle radar system according to claim 13, wherein:

the power control is exercised as a result of a voltage that drops off at the conducting path and that it not constant over time.

16. The motor vehicle radar system according to claim 15, wherein:

the voltage is a fundamental voltage that is clocked at a preestablished pulse-duty factor via a switch.

17. The motor vehicle radar system according to claim 16, wherein:

the fundamental voltage is the operating voltage of the vehicle electrical system.

18. The motor vehicle radar system according to claim 17, wherein:

the at least one arrangement is dimensioned such that an electrical resistance of the conducting path is so small that a long-lasting pulse-duty factor of t/T=1, a multiple of an actually permitted heating power results.

19. The motor vehicle radar system according to claim 16, further comprising:

a control unit for determining the pulse-duty factor.

20. The motor vehicle radar system according to claim 19, wherein:

the control unit includes a memory for storing an input-output map.

21. The motor vehicle radar system according to claim 19, further comprising:

an analog-digital converter integrated with the control unit and for measuring an operating voltage of a vehicle electrical system.

22. The motor vehicle radar system according to claim 15, wherein:

the voltage is a function of at least one of a set of quantities including:

an operating voltage of a vehicle electrical system, an ambient temperature outside a motor vehicle, a speed of the motor vehicle, the surface temperature of at least one of the at least one sensor-radiation transparent body and the at least one radome.

23. The motor vehicle radar system according to claims 22, wherein:

at least one of the set of quantities is made available to a bus system within the motor vehicle.

24. The motor vehicle radar system according to claim 13, wherein:

the at least one arrangement includes a ferromagnetic material.

* * * * *